United States Patent [19]

de Heering

[11] Patent Number: 4,775,028
[45] Date of Patent: Oct. 4, 1988

[54] METHOD AND SYSTEM FOR DEPTH SOUNDING

[75] Inventor: Philippe de Heering, Ottawa, Canada

[73] Assignee: Canadian Astronautics Limited, Ottawa, Canada

[21] Appl. No.: 21,970

[22] Filed: Mar. 5, 1987

Related U.S. Application Data

[63] Continuation of Ser. No. 704,498, Feb. 22, 1985, abandoned.

[51] Int. Cl.$^4$ .......................... G01V 1/00; G01S 15/00
[52] U.S. Cl. .................................. 181/124; 181/109; 367/99
[58] Field of Search .............. 181/101, 108, 109, 110, 181/111, 112, 121, 122, 123, 124, 401; 73/290 R, 290 V, 291, 427; 89/1.51, 1.56, 1.6, 1.61; 102/272, 293, 399, 406, 412, 414, 425, 513; 116/27, 227; 166/901; 244/1 X, 75 R; 340/850, 851; 367/1, 2, 4, 6, 13, 14, 15, 87, 95, 96, 99, 106, 107, 906, 130; 342/118, 123

[56] References Cited

U.S. PATENT DOCUMENTS

| | | | |
|---|---|---|---|
| 1,630,689 | 5/1927 | Behm | 181/124 |
| 4,139,074 | 2/1979 | White | 181/120 |
| 4,242,740 | 12/1980 | Muehle | 367/15 |

FOREIGN PATENT DOCUMENTS 907720 8/1972 Canada.
1019433 10/1977 Canada.

OTHER PUBLICATIONS

Hickman et al., Laser Acoustic Measurements for Remotely Determining Bathymetry in Shallow Turbid Waters, Applied Science Tech., 11/82, pp. 1-4.
Caron, Albert B., Surface Impact Location System, Conference Proceedings of Ocean '72, International Conference on Engineering in Ocean Env., Newport, R.I., USA, pp. 462-467 (Sep. 13-15, 1972).

Primary Examiner—Brian S. Steinberger
Attorney, Agent, or Firm—Mattern, Ware, Stoltz & Fressola

[57] ABSTRACT

A method and apparatus for the sounding of waters, particularly suitable for depth (and the like) sounding of Arctic waters, comprises shooting an energetic projectile at the water or ice surface from, say, a helicopter which has suspended close to the waters surface a suitably housed microphone for receiving the echo energizing from the waters. By measuring elapsed time between firing of the projectile and reception of the echo, and knowing all distances except the depth of the reflecting boundary (be it the bottom or a submarine), the unknown depth is easily determined.

11 Claims, 2 Drawing Sheets

METHOD AND SYSTEM FOR DEPTH SOUNDING

FIELD OF THE INVENTION

This application is a continuation of application Ser. No. 704,498, filed 2/22/85.

The present invention relates to water depth sounding methods in general and in particular to depth sounding by means of reflection echoes. More particularly still, it relates to a method and system for depth sounding and mapping of boundary surfaces underwater without any sustained contact with the body of water and without the use of any explosives in the water. Furthermore, the method and system of the present invention allow sounding of waters and ice covered waters such as under Arctic ice, at closely spaced intervals and with hitherto unattained speed.

BACKGROUND OF THE INVENTION

Methods for echo ranging underwater have generally required placement underwater of sound generating and receiving devices, for example as disclosed in Canadian Patent No. 907,720 issued Aug 15, 1972. The same is true of seismic exploration methods by sound refraction in marine environments, for example, as disclosed in Canadian Patent No. 1,019,433 issued Oct. 18, 1978; U.S. Pat. No. 4,242,740 issued Dec. 30, 1980 and U.S. Pat. No. 4,139,074 issued Feb. 13, 1979.

Arctic exploration presents problems not encountered in general marine depth sounding or exploration. As the last above-mentioned United States patent explains:

Arctic exploration methods and equipment must overcome the problems of the ice-water terrain and frigid arctic temperatures. Since the ice most resembles a land terrain, heretofore methods of seismic exploration used on ice were similar to those of land exploration. This method involved using explosive charges in the form of point charges or a dispersed charge in the water beneath the ice depending on the distribution of energy desired. A recording truck towing a land cable having sections of geophones attached thereto is placed within an appropriate range to detect the seismic signal data created by the explosive charges. The two major problems with the land exploration method used on ice terrain are environmental and economic in nature. Environmentally, use of explosive charges in the water beneath the ice is found to be harmful to the water life therein. Economically, the use of explosive charges over other methods of generating seismic sources is far more expensive.

In marine seismic exploration, seismic events are created by detonating an explosive charge or by generating gaseous explosions using compressed air guns. There are also electrical discharge systems using an underwater spark to create an acoustic pulse, but these are mostly broadband and so generally inefficient with reference to narrow frequency bands of interest in seismic exploration. The seismic signal data generated by the seismic disturbance is detected by hydrophones attached to a streamer towed by a boat through the water Considering the terrain involved in arctic exploration, it is impossible to use a pure marine system. And, for the reasons described above, a pure land exploration system is not practical for arctic exploration. Although an air gun has been used in arctic regions to discharge air creating a seismic disturbance in the water beneath the ice and the seismic signal data from such disturbances has been recorded by geophones, this technique has been generally unreliable because of difficulties encountered in the operation of the air gun under the extreme conditions encountered in arctic regions. Also, air gun handling in both marine and primitive arctic methods heretofore employed has been manually accomplished, this giving rise to a possible safety hazard and increasing the time cycle of exploration, which is defined by the time needed to create and record a seismic disturbance.

This is a good summary of the problems, at least those facing seismic exploration, in Arctic waters A different but not unrelated subject is that of the sounding of Arctic waters to determine depth for purposes of charting the waters. The Canadian Hydrographic Service of the Government of Canada has conducted Arctic water soundings through the ice by means of acoustic methods based on a common principle. The ice surface, sometimes snow covered, has an electro-acoustic transducer applied thereto which transmits sound signals into the ice and water and which receives the echo from the sea floor. The delay from transmission to reception is a measure of water depth. The transducers have been deployed both manually from a tracked vehicle and mechanically pressed against the ice or the snow by actuators placed on tracked vehicles and helicopters.

As will be appreciated, even the method of sounding using mere surface contact with the ice is slow, for the vehicle, whether tracked or helicopter, must stop while a sounding is being conducted. Thus the method is slow.

In a paper published Mar. 1983 in the Journal of the Acoustical Society of America 73(3) by G. Hickman and J. Edwards, titled "Laser-acoustic measurements for remotely determining bathymetry in shallow turbid waters", the authors discuss experiments conducted using an infrared $CO_2$ laser transmitter and a highly sensitive microphone receiver located in the air. The pulsed laser beam generated acoustic signals in water having pulse widths of 20 to 30 microseconds, the echo of which was detected by the microphone. The paper also explains, in addition to pulsed laser sound generation, detection techniques, signal path geometries and related matters. The paper is incorporated herein in its entirety by reference.

It is not known whether ice-covered Arctic waters can be sounded by the laser technique. Furthermore, it is reasonable to expect that snow-covered Arctic waters could not be sounded by that technique. Accordingly, it is desirable to develop a reliable technique for the depth sounding of waters, whether ice-free, ice-covered or snow-covered. covered.

Depth charting of waters requires a non-contact method in order to speed up the process. Yet the laser excitation method is either not practical or reliable enough, or not usable altogether for ice-covered waters, and certainly not for snow-covered (over-ice) waters, because the snow reflects the energy of the laser impulse. This is unfortunate because the sound impulse produced by pulsed laser is narrow and therefore well defined.

SUMMARY OF THE INVENTION

It has been conjectured and subsequently verified that a well-defined, sufficiently intense sound impulse may be generated by striking the surface of sounded waters (whether ice-covered or not) with a suitable projectile, such as one shot by a rifle. Such a bullet easily penetrates snow to the ice surfaces, but is equally effective hitting water surfaces The rifle, and receiving microphone, may be airborne (but not necessarily) for speedy sounding and charting of coastal waters.

The primary object of the present invention has been to speed up the process of Arctic waters sounding and exploration by means of a reliable, and practical, method and system.

Accordingly, the present invention provides an echo sounding for method for determining depth of a boundary under the surace of a body of water, comprising the steps of:

(a) impacting the surface of the body of water with a projectile adapted to generate a sound impulse in the surface on impact;

(b) detecting an echo of said sound impulse;

(c) measuring time elapsed between the sound impulse and the echo; and (d) determining the unknown distance between said surface and a reflecting, under surface, boundary, of said sound impulse from the elapsed time and known distances and sound velocities in media in which said sound impulse and said echo propagated until the latter was detected in step (b).

The preferred method of echo sounding is characterized by impacting at sufficiently frequent intervals a marine surface with a plurality of projectiles sequentially emitted from a moving craft and by registering times of arrival of a corresponding plurality of echoes each of which is a reflection of the sound impulse of the impact of an associated projectile with the marine surface.

A system according to the present invention for echo sounding of a body of water comprises:

(a) means for impacting the surface of the body of water with energetic, moving projectile; and (b) detection means for detecting an echo of the impact sound of said projectile with said surface.

In a preferred version of the system, it further comprises vehicle means for conveying the above system above coastal waters in order to continuously impact the surface thereof and detect the associated echo without stopping or hovering.

The final results of the sounding may of course, be calculated later, or they may be calculated by onboard automatic equipment. Given the times of impact of a projectile and the return of the associated echo, as well as the distances involved, i.e. point of detection to water surface and the relative geometry if it is not above the point of impact, and the sound velocities in the water and in air at the prevailing temperatures, it is well known how to calculate the water depth at the point of projectile impact.

The preferred detection means is a microphone or other acousto-electric transducer. It also appears possible to use a laser vibrometer which would detect the echo as it causes the surface to vibrate, but only for limited applications.

The methods and systems of the present invention are effective for coastal waters whether covered with a layer of ice or not, although the primary object was to facilitate depth sounding of Arctic waters where two meter (or more)thick ice may be encountered. It is admittedly counter-intuitive that such methods of impacting a water (as opposed to ice) surface would produce enough of a sound impulse to be able to detect its echo in the air above. It is also counter intuitive to expect a detectable echo by shooting, say, a 0.3 caliber bullet to impact 2 meter thick ice over the waters sounded. However, both have been demonstrated, and airborne echoes have been obtained in approximately 30 meters deep waters.

BRIEF DESCRIPTION OF THE DRAWINGS

Other aspects of the present invention will be discussed in describing the preferred method and system of the present invention in conjunction with the attached drawings, in which.

DESCRIPTION OF THE PREFERRED EMBODIMENT

Figure 1:
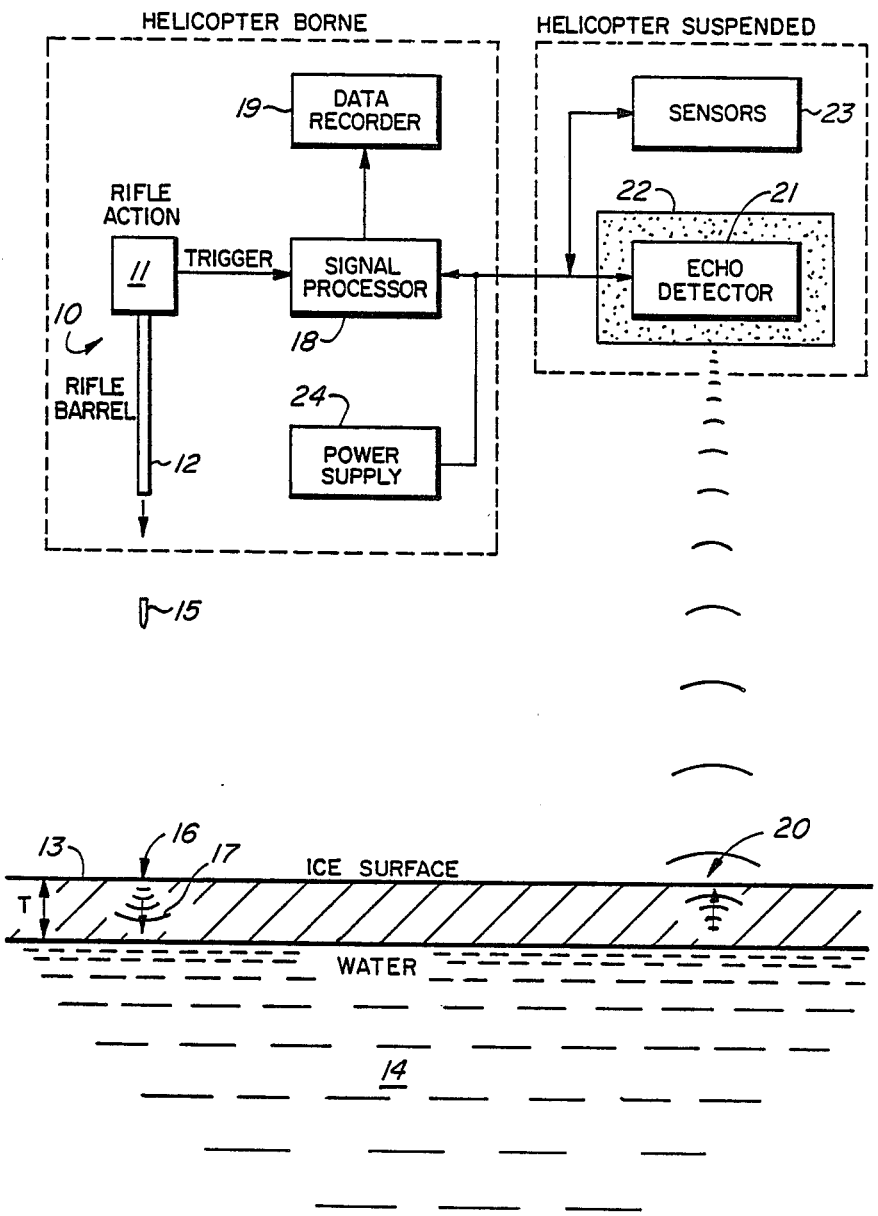
FIG. 1 is a block diagram of a system according to the present invention suitable for continuous depth sounding of Arctic waters from a helicopter.

FIG. 1 of the drawings shows a block diagram of the helicopter borne and suspended system. The system shown comprises a rifle 10 having an action 11 and a barrel 12 pointing downward towards an ice surface 13 covering Arctic waters 14. For purposes of illustration a bullet 15 is shown travelling from the barrel 12 toward the ice surface 13 to impact same at a point 16, thereby producing a sound impulse which propagates downward as a packet of waves 17 through the ice then through the body of water 14. The rifle action 11, when triggered to fire, initializes a signal processor 18 which is set to expect an echo of the packet of waves 17 within a delayed time-window, depending how high the system is above the ice surface 13 and the thickness of ice T. The signal processor 18 has its data outputs feeding a data recorder 19. The sound wave packet 17 propagates through the water becoming progressively dispersed, until partially reflected by the sea bottom as an echo travelling generally in opposite direction. The echo emerges from the ice surface 13. Such emerging echo is, indicated at the point of shortest distance 20 between the ice surface 13 and an echo detector 21 in a sound absorbing housing 22, which, together with sensors 23 is suspended from a helicopter (not shown). The suspended equipment is supplied with power from power supply 24 in the helicopter borne equipment. The signal processor 18 registers the time elapsed between firing of the bullet 15 and the arrival at the echo of the echo detector 21. Knowing the distance d of the rifle muzzle to the ice surface 13, the bullet velocity in air, the ice thickness T, the distance of the echo detector 21 from the ice surface 13 and the velocities of sound in air, ice and water, the depth of the body of water 14 may be calculated.

Contrary to expectation, it was found that the effect of the layer of ice is not very significant. It was postulated that a bullet 15 exiting from the barrel 12 with a kinetic energy of some 8000 J (Joule) would produce an echo equal to that produced by an underwater detonation of 2 grammes of TNT (having a total chemical energy of approximately 8000J). In fact, the acoustic energy released while adequate for the purpose, was found to be somewhat smaller. Such kinetic energy is easily obtained from a 0.460 caliber. Wheatherby magnum bullet weighing 500 grains (32.4 grammes). A 0.3 caliber Wheatherby magnum bullet has approximately half the kinetic energy. Both calibers are commercially available. But the conversion of kinetic energy to sound impulse upon impact with water or ice is optimized by shaping the bullet appropriately.

In an experimental set up to measure the sound pressure levels (SPLs) produced in ice/snow covered river waters it was found that the SPLs ranged between 220 and 240 dB re: 1 μPa at one meter below the ice surface. The highest SPLs were produced by commercially available 0.46 caliber. Wheatherby of point bullet having a mass of 500 approximately 9632 J. This bullet produced SPLs clustered around 235 dB re: 1 μPa at one meter, with SPLs slightly below that for snow-covered ice. The lowest SPLs were produced by 0.3 caliber Spitzer bullet having a mass of 150 grains (9.7 grammes) and a muzzle kinetic energy of 2099 J. It produced levels of approximately 220 dB re: 1 μPa at one meter for snow-covered ice, and approximately 220 dB re: 1 μPa for snow-covered ice, and 230 dB re: 1 μPa for clear ice. However, the only bullet for which there was only slight differences in SPLs (1–2 dB) between snow-covered and clear ice was the 0.46 caliber Whetherby. In all these experiments the ice thickness was approximately 45 cm and the total water depth 550 cm, but the top 10 cm of ice did not at all times have the same consistency. Experiments also revealed that non-deforming (as opposed to soft-point) bullets were less affected by snow cover over ice than deforming (soft-point) bullets.

Later experiments over Arctic ice revealed a range of SPLs between 215 and 230 dB re: μPa at one meter below the ice surface. It was found, however, that the peak SPL levels were obtained using the smaller caliber bullets, such as the 0.3 caliber 9.1 g and 6.5 g Barnes bullets, which travelled at greater velocities. It is not understood why such finding is different from the previously conducted river ice experiments. Although, of course, the range of SPL differences in all the experiments is small, not exceeding 20 dB, and may be within the measurement error range, or be due to higher order factors and effects, such as ice consistency.

In the Arctic experiments the echoes detected ranged from 170 to 180 dB re 1 μPa in the water (measured close to the water/ice interface); and between 80 to 90 dB re: 1 μPa at one meter in the air above the ice surface. About 70 to 80 dB of the difference in SPLs between water and air are due to impedance-mismatch losses at the ice-to-air boundary. In these experiments, the ice was 180 cm thick, while its surface was 27 m above the sea floor. The measurements were made with a 3 ms time-window. The 6-dB bandwidth of the sound power spectra ranged from 0.5 to 3.0 kHz for the 0.46 caliber bullets; and from 0.8 to 3.5 kHz for the 0.3 calibrer bullets.

It was also found in the experiments that there was under water a beam pattern having a beamwidth of approximately 40 degrees between the −3 dB points. Within that conical beam the sound impulses were relatively well-defined for projectile impacts on the solid ice or when penetrating bullets were used on ice or snow-covered ice.

These experimental measurements were conducted using a Bruel & Kjaer Type 8103 hydrophone in the water and a type 4921 outdoor microphone in the air.

Given the SPLs produced in the waters by the projectile, it was postulated and verified that the signal-to-noise ratio (SNR) of the echo in the air above the waters would be such that detection is possible. The SNR or the SPL of the echo in the air depends of course on the depth of the waters, given the relatively constant attenuation of approximately 80 dB of sound pressures from the water across the ice to the air immediately above. It is important to note that most of that attenuation is due to the impedance mismatch at the ice-air boundary and is therefore not strongly dependent on the thickness of the ice layer.

Detection of the echo in air is facilitated by the fact that the time of echo arrival (within a time-window) could be estimated. State of the art signal processing techniques are available for echo detection, they are, however, outside of the scope of the present invention.

Figure 2:
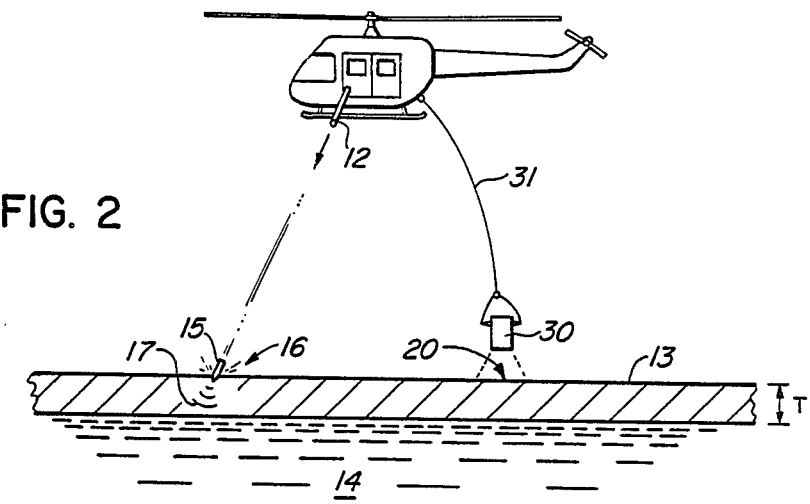
FIG. 2 depicts helicopter depth sounding of Arctic waters by the system of FIG. 1.

FIG. 2 of the drawings depicts how the equipment in FIG. 1 is used for continuous through the ice sounding by means of a helicopter. The helicopter suspended equipment is housed in a housing 30 that hangs by means of suspension cable 31 to be a few feet or meters above the ice surface 13 behind the point of impact 16 of the bullet 15 fired in a slightly forward direction from the rifle barrel 12.

Figure 3:
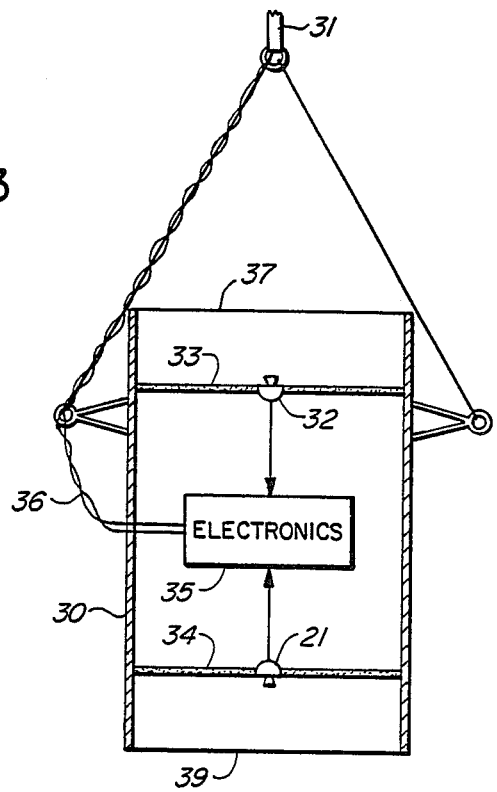
FIG. 3 is a close-up of the helicopter suspended microphone housing shown in FIG. 2.

Details of the housing 30 are shown in FIG. 3. The housing 30 shown is cylindrical in shape at one end of which is a noise-reference microphone 32 is directed to receive the helicopter noise and is isolated from the lower portion of the housing by a sound absorbing baffle 33. The echo detector 21 is focussed downwardly to receive the emerging echo and is isolated from the helicopter noise as much as possible by means of baffle 34. The housing 30 also houses necessary electronics 35, which are powered by and connected to the helicopter borne equipment by means of electrical cable 36. The housing 30 is closed at each end thereof by means of protective and grid-noise attenuating screens 37 and 39. Although the helicopter-noise microphone is not necessary in principle for operation, it is desirable, in order to increase the signal-to-noise ratio of the echo signal after processing, by subtracting a suitably delayed and attenuated version of the helicopter noise received by the microphone 32. While the diameter of the housing 30 is not critical, it might be desirable to have a sufficiently large cylinder to improve reception of the echo by the microphone 21 at the frequencies of interest, i.e. from 500 Hz to 4000 Hz. Moreover, in order to focus the microphone 21 on the ice surface below, the baffle 34 might be parabolic shaped with the microphone 21 placed in its focus. Acoustic and electronic processing technique now known in the art are sufficiently advanced to permit improvements in operation that are, however, outside the scope of the present invention.

The embodiments of the invention in which an exclusive property or privilege is claimed are defined as follows:

1. An echo sounding method for determining the depth of a boundary under the surface of a body of water even if the water is covered by ice or by ice and snow, comprising the steps of:
   (a) impacting the upper surface of the body of water or the upper surface of the ice if the water is covered by ice or by ice and snow with a bullet-type projectile so as to generate an impact sound impulse at the upper surface of the water or the upper surface of the ice, if ice or ice and snow covers the water;

(b) detecting in the air and at a predetermined distance above the upper surface of the body of water, an echo of the sound impulse reflected by said boundary;

(c) measuring time elapsed between the sound impulse and the echo at said predetermined distance; and (d) determining the depth under the upper surface of the water with respect to said boundary from the elapsed time, the predetermined distance, the known thickness, if any, of any covering ice or ice and snow, and known sound velocities in the body of water and in the air.

2. The method as defined in claim 1 wherein times elapsed measured in step (c) are recorded and used to determine corresponding depths in accordance with step (d).

3. The method as defined in claim 1, characterized by repeating steps (a), (b) and (c) in sequence from a moving craft above the surface of the body of water.

4. The method as defined in claim 3, said moving craft being a helicopter, and said bullet-type projectile being a rifle bullet having a muzzle kinetic energy of at least approximately 2,099 joules.

5. A method as defined in claim 3, wherein the step of impacting the upper surface of the body of water, ice or ice and snow with bullet-type projectile is performed by a first device forward of a second device which performs the detecting in the air of the echo, wherein the first and second devices are attached to the moving craft.

6. A method as defined in claim 5, wherein the second device is an echo detector which is focused downwardly and which comprises a first microphone for measuring noise generated by the moving craft and a second microphone for detecting the echo, and wherein the step of determining the depth further comprises the step of subtracting an attenuated version of a noise generated by the moving craft from the echo so as to increase the signal-to-noise ratio of the echo.

7. A method as defined in claim 6, wherein the echo detector comprises a housing with upper and lower grid-noise attenuating screens, a first sound absorbing baffle in proximity to the first microphone and a second sound absorbing baffle in proximity to the second microphone.

8. A system for echo sounding of a body of water even if the water is covered by ice or by ice and snow comprising;
   a. means for impacting the upper surface of the body of water or the upper surface of the ice if the water is covered by ice or by ice and snow with an energetic, bullet-type projectile so as to generate an impact sound impulse; and
   b. detection means for detecting in the air an echo of the impact sound impulse of said bullet-type projectile at a predetermined distance above the upper surface of the body of water; and
   c. means for determining elapsed time between impact of said bullet-type projectile with said surface and detection of said echo; and
   d. means for determining the depth under the upper surface of the water with respect to a boundary under the body of water from the elapsed time, the predetermined distance, the known thickness, of any covering ice or ice and snow, and known sound velocities in the body of water and in the air, and if present, in the ice.

9. A system for echo sounding of a body of water even if the water is covered by ice or by ice and snow comprising;
   a. means for impacting the upper surface of the body of water or the upper surface of the ice if the water is covered by ice or by ice and snow with a rifle bullet, so as to generate an impact sound impulse; and
   b. detection means for detecting in the air an echo of the impact sound impulse of said rifle bullet at a predetermined distance above the upper surface of the body of water; and
   c. a helicopter for firing the rifle bullet; and
   d. means for determining the depth under the upper surface of the water with respect to a boundary under the body of water from an elapsed time between impact of the rifle bullet with said surface and detection of said echo, the predetermined distance, the known thickness of any covering ice or ice and snow, and known sound velocities in the body of water and in the air and if present in the ice.

10. A system for echo sounding of a body of water even if the water is covered by ice or by ice and snow comprising;
    a. means for impacting the upper surface of the body of water or the upper surface of the ice if the water is covered by ice or by ice and snow with an energetic, bullet-type projectile so as to generate an impact sound impulse; and
    b. detection means for detecting in the air an echo of the impact sound impulse of said bullet-type projectile at a predetermined distance above the upper surface of the body of water; and
    c. means for determining elapsed time between impact of said bullet-type projectile with said surface and detection of said echo; and
    d. a device forward of the detection means for firing the bullet-type projectile from a moving craft; and wherein the detection means is an echo detector which is focussed downwardly and which comprises a first microphone for measuring noise generated by the moving craft and a second microphone for detecting the echo and wherein an electronic signal processing means includes means for subtracting an attenuated version of the craft noise generated by the moving craft from the echo so as to increase the signal to noise ratio of the echo.

11. A system as defined in claim 10, wherein the echo detector comprises a housing with upper and lower grid-noise attenuating screens, a first sound absorbing baffle in proximity to the first microphone and a second sound absorbing baffle in proximity to the second microphone.

* * * * *